United States Patent Office 3,013,019
Patented Dec. 12, 1961

3,013,019
BIS(P-BENZOYLPHENYL)THIOPHENES
Harry Braus, Springdale, Ohio, and Jay R. Woltermann, Fort Thomas, Ky., assignors to National Distillers and Chemical Corporation, New York, N.Y., a corporation of Virginia
No Drawing. Filed July 29, 1959, Ser. No. 830,193
1 Claim. (Cl. 260—332.3)

This invention relates to new and novel organic compounds and, more particularly, to bis(p-benzoylphenyl)thiophenes.

It is an object of this invention to prepare bis(p-benzoylphenyl)thiophenes.

It is another object of this invention to provide bis(p-benzoylphenyl)thiophenes to be used as fluorescent pigments in resinous and other compositions.

It is a further object of this invention to convert 1,4-bis(p-benzoylphenyl)butane to 2,5-bis(p-benzoylphenyl)thiophene.

Other objectives of the invention will be apparent from the detailed description set forth below.

It has now been discovered that new and novel compounds may be prepared by reacting a bis(p-benzoylphenyl)-hydrocarbon containing four carbon atoms in the chain, such as a bis(p-benzoylphenyl)butane or a bis(p-benzoylphenyl)butadiene, with a ring-closing agent, such as sulfur or a sulfide, according to the following equation:

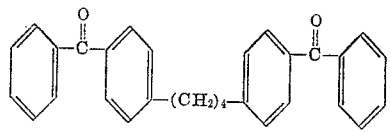
Bis(p-benzoylphenyl)butane or

+S or a sulfide⟶

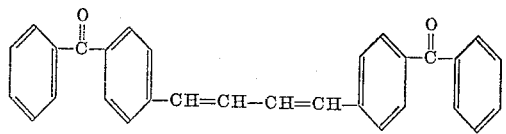
Bis(p-benzoylphenyl)butadiene

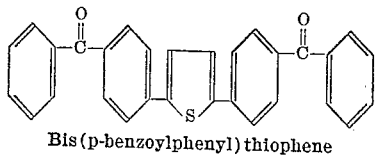
Bis(p-benzoylphenyl)thiophene

In a preferred method of carrying out this reaction, bis(p-benzoylphenyl)butane and sulfur are heated at a temperature between about 200° C. and 400° C., and preferably at a temperature between about 240° C. and 320° C. The evolved hydrogen sulfide is driven off by extended heating at the reaction temperature. The product is purified and decolorized by recrystallization from any of a variety of solvents, such as benzene, toluene, and the like.

For preparing the bis(p-benzoylphenyl)thiophenes as embodied herein, the starting materials, i.e., bis(p-benzoylphenyl)hydrocarbons, may be obtained by any convenient method. 1,4-bis(p-benzoylphenyl)butane may be prepared, for example, by the reaction of 1,4-diphenylbutane with benzoyl chloride.

The ring-closing agent may be sulfur; an inorganic sulfide, such as $P_2S_3$ or $P_2S_5$; or an organic sulfide. The sulfur or sulfide is employed in an amount equivalent to approximately 5 moles per mole of bis(p-benzoylphenyl)butane or 2 moles per mole of bis(p-benzoylphenyl)butadiene used. When less than this amount of sulfur or sulfide is used, the yields of the thiophene will be correspondingly lower; when an amount greater than about a 10% excess is used, yields will be decreased also since additional purification will be required to eliminate sulfur contamination of the final product.

The temperature required for the reaction will vary with the reactants selected. In general, however, the reaction takes place at a temperature between about 200° and 400° C. For example, 1,4-bis(p-benzoylphenyl)butane reacts with sulfur at about 240° to 320° C., with maximum yields being obtained at about 300° to 320° C.

The compounds of the present invention are stable, pale yellow solids which are quite insoluble in water and in most cold common organic solvents. They have been found to be excellent fluorescent pigments which, under suitable activation, impart a greenish fluorescence to various types of resinous and plastic compositions, such as polyolefins as for example polyethylene, polyvinylchloride, styrene, polystyrene, acrylonitrile polymers, acrylates such as methyl acrylate and methyl methacrylate, cellulose, cellulose esters and ethers, polyamides, polyesters, polyurethanes, and the like. The amount of the bis(p-benzoylphenyl)thiophene required to impart fluorescence to a resin may vary between about .01 to .1 percent by weight based on the total weight of the resin solids; optimum results are obtained when the amount of fluorescent material is about .03 to .06 percent by weight.

The following are typical examples of the application of this invention. It is not intended, however, that the invention be strictly limited thereto. Except where otherwise specified, all parts are given by weight.

*Example 1*

A mixture of 4.2 parts of 1,4-bis(p-benzoylphenyl)butane and 1.3 parts of sulfur was heated until a homogeneous molten phase was obtained, that is at a temperature between about 200° and 225° C. The temperature was then increased to about 320° C. to maintain smooth evolution of hydrogen sulfide, and the final portion of the hydrogen sulfide was removed by heating the mixture for two hours at 320° C. The crude reaction mixture was then cooled to about 25° C., taken up in benzene, boiled with activated carbon, and filtered. The product was purified by dissolving it in toluene, reboiling it with activated carbon, filtering, cooling, and air-drying. The resulting pure 2,5-bis(p-benzoylphenyl)thiophene melted at 216–217° C. and contained 81.10% C (81.05 calculated), 4.75% H (4.54% calculated), and 7.15% S (7.21% calculated).

The compound fluoresced under ultraviolet light and imparted a greenish fluorescence to a vinyl resin with which it had been milled.

*Example 2*

The procedure of Example 1 was followed, except that $P_2S_3$ was used instead of sulfur. Comparable results were obtained.

While illustrative examples have been given of the practice of the present invention, it will be understood that the invention may be practiced in other ways and that various modifications and changes may be made in the embodiments given without departing from the spirit of the invention or from the scope of the following claim.

What is claimed is:
2,5-bis(p-benzoylphenyl)thiophene.

References Cited in the file of this patent

Smith et al.: Journal of American Chemical Society, vol. 63, pages 1184 (1941).
Chemical Abstracts, vol. 48, page 2635g (1954).